United States Patent [19]

Diping et al.

[11] Patent Number: 5,849,060
[45] Date of Patent: Dec. 15, 1998

[54] CONTROLLED RELEASE FERTILIZER AND PREPARATIONS THEREOF

[75] Inventors: Li Diping; Wang Haobin; Xu Xiucheng; Hou Cuihong, all of Zhengzhou, China

[73] Assignee: Zhengzhou Centre of Popularization & Research on Zhengzhou Luxuriance Phosphate & Compound Fertilizer, China

[21] Appl. No.: 695,386

[22] Filed: Aug. 9, 1996

[30] Foreign Application Priority Data

Aug. 17, 1995 [CN] China .............................. 95 1 09720.2

[51] Int. Cl.$^6$ ..................................................... C05G 5/00
[52] U.S. Cl. ................. 71/64.07; 71/28; 71/29; 71/30; 71/31; 71/32; 71/33; 71/34; 71/35; 71/36; 71/64.11
[58] Field of Search ............... 71/28–36, 64.07, 71/64.11, 64.13, 903, 904

[56] References Cited

U.S. PATENT DOCUMENTS 4,804,403  2/1989  Moore ........................................ 71/28

FOREIGN PATENT DOCUMENTS 85101008A  2/1988  China .
89102295.3  3/1990  China .
9206056  4/1992  WIPO ................................... 71/64.11

OTHER PUBLICATIONS

Zhang Baolin et al., "Luxuriance: A slow–acting compound fertilizer from China", Nitrogen No. 191 (May/Jun. 1991).

*Primary Examiner*—Wayne Langel
*Attorney, Agent, or Firm*—Pennie & Emonds LLP

[57] ABSTRACT

The present invention relates to a controlled release fertilizer having water-soluble fertilizers as nucleus and limited-soluble plant nutrient compounds as coating layers, characterized in that more than two coating layers of limited-soluble compounds are formed around the nucleus, and that the release rates of the fertilizer can be controlled by regulating the solubilities of the limited-soluble compounds. The invention also relates to a process for preparing the controlled release fertilizer.

4 Claims, 3 Drawing Sheets

CONTROLLED RELEASE FERTILIZER AND PREPARATIONS THEREOF

FIELD OF THE INVENTION

The present invention relates to a controlled release fertilizer and the methods for preparing the same.

BACKGROUND OF THE INVENTION

A controlled release fertilizer is a kind of compound fertilizer which can control the release of plant nutrients therefrom.

Nowadays, people have paid more attention to development of various kinds of compound fertilizer so that the plant nutrients contained can be slowly released within a required time, and that the release rate can be consistent with rates of plants absorption during their growing stages. Since 1960s, various coated fertilizers have been developed in U.S.A, Japan, England, France etc., of which sulfur coated fertilizer and resin coated fertilizer are two of the main types.

Sulfur coated fertilizer was first developed by U.S.A in 1961, and came into commercial production in 1978. In 1990, the output of the fertilizer in the world had amounted to 115,000t which was below 0.2 percent of the amount of the total urea output in the world. In 1975, the sulfur coated compound fertilizer was developed by Japan; and in 1981, sulfur coated potassium chloride and sulfur coated potassium sulfate fertilizers were developed by O. M. SCOTT, U.S.A. Processes for coating sulfur are very complicated in that melted sulfur is first coated on the surfaces of urea granules, and then the sulfur coated surfaces are sealed with melted paraffin wax. The weakness of this kind of fertilizer is that the nucleus of the fertilizer is released out very quickly and that the coated wax is easy to be decomposed by microorganisms in the soil, as a result of which the controlled release effect is disadvantageously affected.

The coating layer of a resin coated slow release fertilizer represented by the OSMOCOTE® U.S.A is essentially composed of a copolymer of cyclopentadiene dimer and glyceride, the amount of the coating layer is at a level of about 10–15% wt of the total weight of fertilizer. The resin coated slow release fertilizer has excellent controlled release properties. The contained plant nutrients can be controlled to release out 80% of the nutrients in 120–360 days.

The common disadvantage of the above-said two types of coated fertilizers is that they are expensive. For example, according to U.S.A market price in 1994, the price of SCU was 1.7 times as much as that of the urea, and the resin coated fertilizer was 8.2 times as much as that of the urea.

On the other hand, a coated compound fertilizer was disclosed in China Patent CN 851010089 which comprises the granular urea or ammonium nitrate as nucleus coated with a fertilizer selected from FMP (fused magnesium phosphate ), precipitated calcium phosphate and bone powder, with the use of nitrogen phosphorus slurry as binders.

This kind of fertilizer whose cost is greatly decreased with the use of fertilizer coated with fertilizer, was honored as "the cheapest slow release fertilizer came from China" by an international magazine ("Nitrogen", No. 191, pages 35–41, May–Jun., 1991). The price of the fertilizer in China is only 75 percent of that of urea. However, under the electronic microscope, the coating layer of the fertilizer observed shows a slice structure with many large and small holes and cracks on surfaces of the fertilizer, which can not prevent water from penetrating the coating layer effectively. When soaked in water, the coated urea and ammonium nitrate in the nucleus of the fertilizer will be dissolved out completely in 1.5–2.0 hours so that a good controlled release effect can not be achieved.

As an improvement a slow release coated fertilizer is disclosed in Chinese Patent CN89102295, which comprises using vegetable oils, animal oil or their greases or their modified substances as a retarder in the coating layer so that the release time of nutrients in the nucleus can be prolonged to 15–30 days, by this way, the release of nutrients in the nucleus can be retarded. But there are some shortcomings:

a. The release of water soluble potassic fertilizer can not be retarded.

b. Adding so many retarders which are not plant nutrients into fertilizer will affect the total nutrient content in the fertilizer, c. Adding retarders alone can not control the release rate of nitrogen, phosphorus and potassium freely.

It is therefore an object of the present invention to provide a type of compound fertilizer composed of compounds containing nitrogen, phosphorus, potassium, magnesium and trace elements with various release rates. By regulating the structure and the composition of the coating layers, solubilities of the limited-soluble compounds can be changed, and release rate of nutrients can be controlled so as to satisfy with the desire of plants in different growing stages.

It is another object of the invention to provide a method for preparing said controlled release fertilizer.

SUMMARY OF THE INVENTION

The present invention provides a controlled release fertilizer with water-soluble fertilizer(s) as nucleus and limited-soluble plant nutrients as coating layers, characterized in that coating layers of limited-soluble compounds are formed around the nucleus, and that release rates of the nutrients can be controlled by regulating the solubilities of the limited-soluble compounds. The present invention also provides methods for preparing the abovementioned fertilizers, which comprise the following steps mainly:

a) selecting one or more fertilizer(s) as nucleus;

b) coating with limited soluble compounds on said nucleus to form at least two coating layers by means of a binder.

DETAILED DESCRIPTION OF THE INVENTION

Figure 1A:
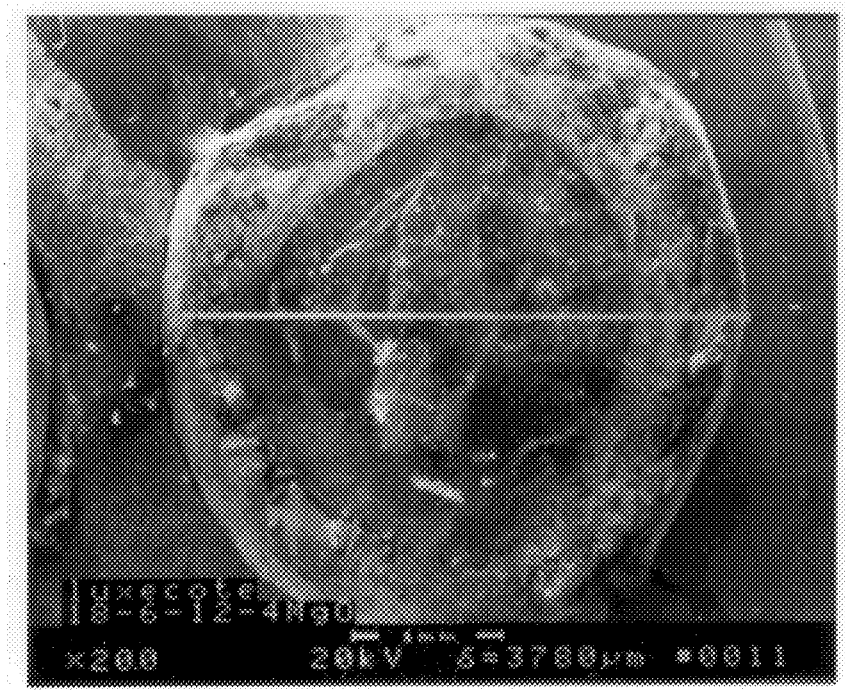
FIG. 1 shows the structure of coating layers under a scanning electron microscope.
Figure 1B:

The coating layer of the controlled release fertilizer according to the present invention can be formed by using a mixture of sulfuric acid or phosphoric acid at certain concentrations with monoammonium phosphate (MAP); diammonium phosphate (DAP) or ammonium bicarbonate as binders to coat with compounds with various solubilities on the surface of water-soluble granular fertilizers layer by layer; or by using reactive binders to coat with compounds containing nitrogen, phosphorus, potassium, magnesium and trace element on the surface of water-soluble fertilizers, during which period limited-soluble compounds are formed in the form of several coating layers. Water-proof substances such as silicone or calcium carbonate stearate can be added into the coating layers to enhance the hydrophobicity. And outside the coating layers reactive magnesium oxide or phosphate rock powder can be added to form fine and close shells. The present invention also provides use of the controlled release fertilizers in lawns (especially golf course) and ornamental plant.

The present invention is accomplished by the following procedures:

1. Synthesization of the limited water-soluble compounds containing nitrogen, phosphorus, potassium, magnesium and trace elements, e.g., zinc, manganese, etc., which are essentially phosphates of metals having the formula:

$$MM'PO_4,$$

in which M is K, Na or $NH_4$, M' is Mg, Ca, Zn, Mn, Cu or Fe.

The compositions of these compounds are shown in Table 1.

value of 2. Continuously adding with ammonia the pH value of the suspension was increased to a level from 5 to 6, resulting in a suspension containing $MgNH_4PO_4 \cdot H_2O$ and MgO, after filtering, obtaining a coating material of a controlled release fertilizer which contains nitrogen 10.2 wt %, $P_2O_5$ 45.9 wt %, MgO 26.2 wt % ("Phosphate and Compound fertilizer", No.4, pp19–20, 1989). Compounds 10–12 in Table 1 are commercially available products and compound 13 is formed by the absorption of carbon dioxide in air on magnesium hydroxide. The plant nutrients, such as nitrogen, phosphorus, potassium, magnesium, zinc and manganese contained in the above compounds with limited solubilities in water can be slowly released in water. The coating layers composed of the above compounds are in an amount of 35 to 68 percent on the basis of the total weight of the fertilizer.

2. Selection of the binders. The binders used comprise non-reactive binders and reactive binders. The non-reactive binders can be a mixture of sulfuric acid or phosphoric acid at certain concentrations with monoammonium phosphate, diammonium phosphate or ammonium bicarbonate, which mixture is bound with compounds having various solubilities and coated on the surface of water-soluble granular fertilizer layer by layer. On the other hand, the binders can be reactive binders which can react with single fertilizer such as urea, monoammonium phosphate, diammonium phosphate, ammonium bicarbonate, ammonium sulfate,

TABLE 1

The compositions and solubilities of the limited-soluble compounds

| No. | compounds | molecular weight | N | $P_2O_5$ | $K_2O$ | MgO | other | solubility at room temperature g/100g$H_2O$ |
|---|---|---|---|---|---|---|---|---|
| 1 | $MgHPO_4 \cdot 3H_2O$ | 174.33 | — | 40.72 | — | 23.12 | — | 0.025 |
| 2 | $MgNH_4PO_4 \cdot H_2O$ | 155.27 | 9.02 | 45.69 | — | 15.65 | — | 0.014 |
| 3 | $MgNH_4PO_4 \cdot 6H_2O$ | 245.27 | 5.71 | 28.92 | — | 9.91 | — | 0.018 |
| 4 | $ZnNH_4PO_4$ | 178.3 | 7.85 | 39.92 | — | — | Zn 36.6 | 0.015 |
| 5 | $MnNH_4PO_4 \cdot H_2O$ | 185.97 | 7.58 | 38.18 | — | — | Mn29.5 | 0.0031 |
| 6 | $CaHPO_4 \cdot 2H_2O$ | 172.10 | — | 41.25 | — | — | — | 0.025 |
| 7 | $CaK_2(SO_4)_2 \cdot 3H_2O$ | 328.3 | — | — | 28.69 | — | S 19.5 | 0.25 |
| 8 | $KMgPO_4 \cdot H_2O$ | 176.27 | — | 42.27 | 26.72 | 22.88 | — | limited-soluble |
| 9 | $KCaPO_4 \cdot H_2O$ | 191.97 | — | 36.96 | 24.53 | — | — | limited soluble |
| 10 | FMP | not constant | — | 18 | 0.5 | 12 | — | 0.0016 |
| 11 | MgO | 40.32 | — | — | — | 100 | — | 0.00062 |
| 12 | $Mg(OH)_2$ | 58.34 | — | — | — | 60.13 | — | 0.0009 |
| 13 | $3MgCO_3 \cdot Mg(OH)_2 \cdot 3H_2O$ | 365.37 | — | — | — | 44.12 | — | 0.04 |

The compounds in Table 1 are all known compounds.

Compounds 1–9 in Table 1 can be prepared by phosphoric acid, sulfuric acid, magnesium oxide, magnesium carbonate, calcium oxide, ammonium phosphate, calcium carbonate, ammonium bicarbonate, zinc sulfate, manganese sulfate, potassium chloride or potassium sulfate according to literatures (such as "Inorganic Chemical Compound Synthesis Handbook" Vol. 1–2, edited by Japanese Chemistry Society, "The production and application of phosphates", pages 112–372). For example, when magnesium oxide is reacted with phosphoric acid, and the first and second hydrogen ions of the acid are completely neutralized (pH=2), a suspension of $MgHPO_4 \cdot 3H_2O$ is formed, which is further neutralized with ammonia to form a mixture of $MgHPO_4 \cdot 3H_2O$ and $MgNH_4PO_4 \cdot H_2O$. An example listed in literature is as follows:

47.5 kg of magnesium oxide (85% in purity, industrial grade) was added to 355 kg of phosphoric acid (20% of $P_2O_5$, industrial grade). The reaction temperature was maintained at 85° C. for 0.25 hour with continuously stirring to form a suspension of $MgHPO_4 \cdot 3H_2O$ and MgO with a pH potassium chloride or potassium sulfate to form limited-soluble compounds. Two kinds of reactive binders can be selected, one kind is organic binders such as formaldehyde, starch and carboxy methyl cellulose, which can condense with urea to form limited-soluble compounds containing nitrogen. Urea has a property of condensation-addition with various organic compounds (UREA, ITS PROPERTIES AND MANUFACTURE). Now an example is taken for illustrating the condensation reaction of urea with formaldehyde. 0.04 kg hexamethyleneamine was added to 3kg formaldehyde solution (37 wt %), after completely dissolved, 0.8 kg urea was added with continuously stirring and heating until said urea was completely dissolved. The mixture was heated to a constant temperature of 60° C. for 15 min., then the temperature was maintained at 92° C. for 70 min., so that urea-formaldehyde condensation was taken place, 0.4 kg aqueous urea solution (50 wt %) was added in 30 min. to keep on the reaction. After 20 min., the reaction was stopped. The reaction solution was cooled to 60° C. and then a 10% aqueous sodium hydroxide solution was added to neutralize the urea-formaldehyde resin solution till pH=7, and then the reaction mixture was cooled to room temperature to obtain a semi-transparent slurry, which was then mixed with water in a ratio of 1:5 to get urea-formaldehyde resin binders. The other kind of binders is inorganic binders such as phosphoric acid or sulfuric acid used alone or mixed with monoammonium phosphate, diammonium phosphate, ammonium bicarbonate or ammonium sulfate, said binders can react with magnesium oxide, calcium oxide, zinc sulfate, manganese sulfate, potassium sulfate or potassium chloride to obtain compounds 1–9 in Table 1. The concentrations and formulations of the selected binders are shown in Table 2. The amount of the binders is 5–10% on the basis of the total weight of fertilizer.

TABLE 2

The specification and concentration of binders

| No. | Name of binders | concentration or formulation |
|---|---|---|
| OA | formaldehyde solution | 36~40% (wt) |
| OB | 2–10% carboxymethyl cellulose: urea | 1:0.2~0.4 |
| OC | amylum solution | 2~10% (wt) |
| IA | phosphoric acid | 30~60% $P_2O_5$ |
| IB | sulfuric acid | 6~30% (wt) |
| IC | 30–60% phosphoric acid: ammonium bicarbonate | 1:0.3~0.6 (wt) |
| ID | 6–30% sulfuric acid: monoammonium phosphate or diammonium phosphate | 1:0.5~0.7 (wt) |

3. The solubilities of limited-soluble compounds 1–10 in Table 1 can be adjusted by adding inorganic additives such as ammonium sulfate, ammonium chloride, ammonium nitrate and magnesium sulfate into the coating layer and the release rates of nutrients in the fertilizer can be controlled. The amount of regulator is 0–5% on the basis of the total weight of fertilizer. For example, the solubility of $MgNH_4PO_4.6H_2O$ in Table 1 can be adjusted by adding ammonium sulfate as shown in Table 3. When no ammonium sulfate is added, 80% nitrogen in the fertilizer can be released out within 140 days. If adding 5% ammonium sulfate, the release period is only 70 days.

The solubilities of the limited-soluble compounds can also be changed by adjusting the pH values of the salts contained in the coating layers so as to control the release rates of the fertilizers. For example, the solubilities of FMP listed in Table 1 will change along with the pH values of the solutes, as shown in Table 4.

TABLE 3

The effection of ammonium sulfate on the solubility of $MgNH_4PO_4.6H_2O$, 25° C.

| Concentration of $(NH_4)_2SO_4$ (g/100 g solution) | The solubility of $MgNH_4PO_4.6H_2O$ (g/100 g solution) |
|---|---|
| 0 | 0.018 |
| 1.25 | 0.1415 |
| 2.50 | 0.1876 |
| 5.0 | 0.2493 |
| 10.00 | 0.3535 |

TABLE 4

The effect of pH on the solubility of FMP, 15% magnesium sulfate solution (wt %)

| pH | 6.0 | 6.5 | 7.0 | 7.5 | 8.0 | 8.5 | 9.0 | 9.5 | 10.0 | 10.5 |
|---|---|---|---|---|---|---|---|---|---|---|
| Solubility(wt %) | 9.5 | 7.8 | 6.6 | 5.6 | 5.4 | 5.3 | 3.8 | 0.28 | 0.03 | 0.013 |

Usually, the dissolution condition, i.e. the pH value is controlled to be more than 7 to decrease the solubilities of the limited soluble compounds in Table 1 and thus prolong the release time of nutrients. On the contrary, if the pH value of the solution is less than 7, then the release of the nutrients can be accelerated.

4. Treatment of the toppest layer of the coating layers can increase the density of the coating layers and decrease the hydrophilicity of the coating layers. Therefore, powder is applied on the surface of the coating layer. The powder used comprises fine magnesium oxide powder(<0.075 mm), which absorbs carbon dioxide from air to form compound 13 in Table 1 with smooth and fine shells. Alternatively, a calcium carbonate stearate powder (a water proof and insulated powder material whose preparing method can be found in Chinese Patent CN 91105131.7) is applied or a organic silicone is coated on to form a hydrophobic layer. The amount of the powder and hydrophobic layer applied is 2–5% by weight of the total fertilizer.

As stated above, the controlled release fertilizer according to the present invention can be manufactured by using granular water-soluble fertilizer such as urea, ammonium nitrate monoammonium phosphate, diammonium phosphate, potassium chloride, potassium sulfate and other compound fertilizer as nucleus, and coating on the nucleus with compounds containing nitrogen, phosphorus, potassium, magnesium and trace elements and having different limited solubilities layer by layer; or coating on the nucleus with limited soluble compounds which are formed by the reaction between a reactive binder and a single fertilizer during coating process. The number of coating layers are not less than 2, and preferable 3–5 so that the coating layers have a desirable thickness and different release rate. The solubility of limited-soluble compound can be changed by regulating the composition and pH value of coating layers, by which nutrient-releasing rate can be controlled to a release period of 60–240 days (the time required to release 80% nutrients). A controlled release fertilizer containing 30–50 wt % nitrogen, phosphorus pentoxide, potassium oxide and magnesium oxide can be manufactured optionally. Analysis with a scanning electroscope found that the cross section of coating layers was composed of dense amorphous compounds.

The controlled release fertilizer is essentially composed of nucleus and coating layers, the amount of nucleus is 20–50% by weight of the total mass, while the amount of coating layer is 50–80% by weight of the total mass. And the coating layer is comprised of a limited-soluble compound, an adjustment agent, a powder and a binder, which are 35–70%, 0–5%, 2–5% and 5–10% by weight of the total fertilizer respectively most of which are plant nutrients.

EXAMPLE

The following examples will illustrate the present invention in detail (The following parts referred to are all in weight portions).

Example 1

Figure 2:
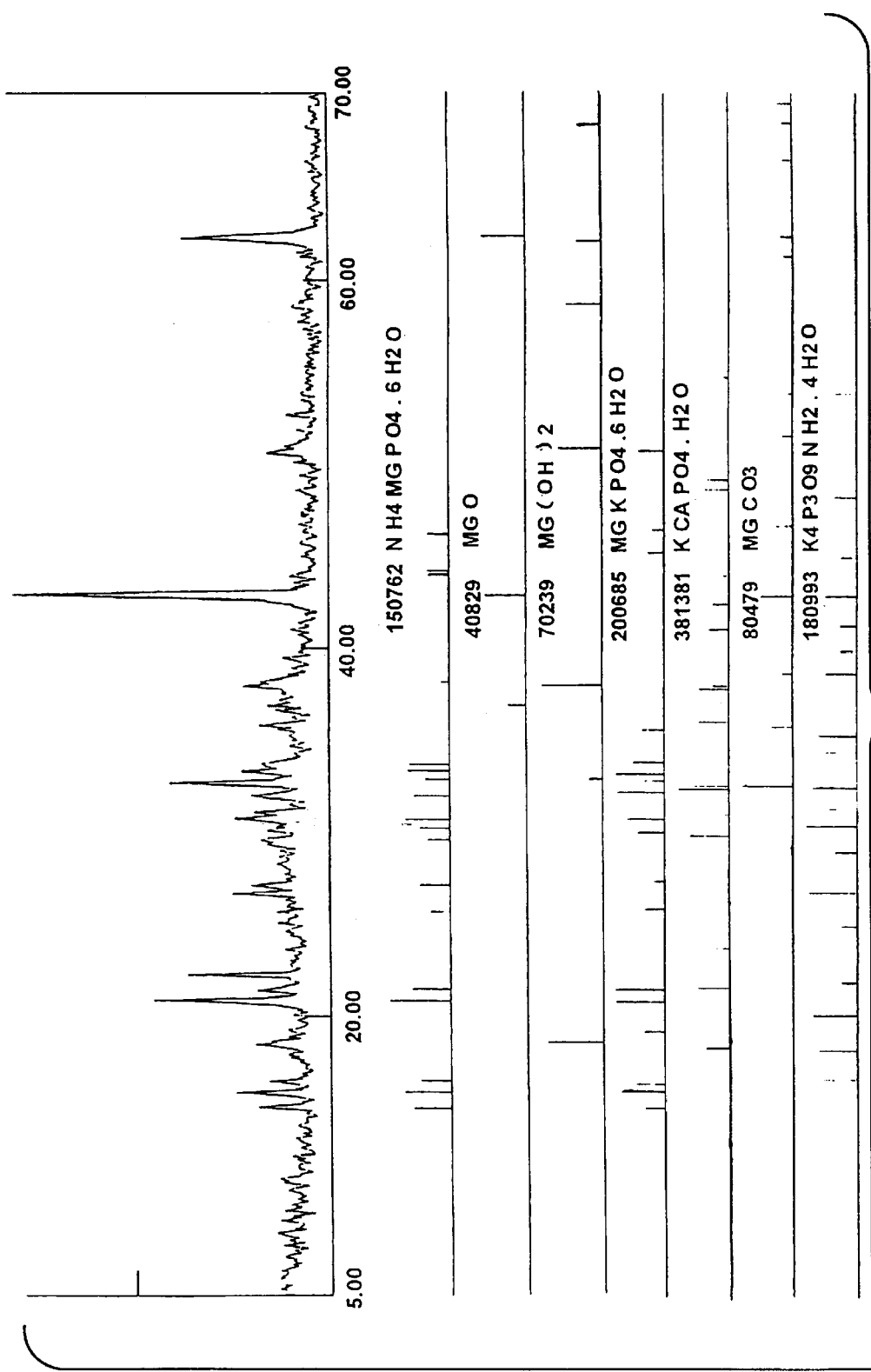
FIG. 2 represents X-ray diffraction spectrum.

35 parts of granular urea was put into a special CCF granulator (China patent number: ZL892 14248.0), and preheated to 60° C. by blowing hot air (70° C.) heated by an electric heater. Then 1.3 parts formaldehyde (37 wt. %) solution containing hexamethyleneamine was sprayed into the granulator by an atomizer, after the granular urea was wetted, 3.6 parts powder urea was continuously added during the spraying of formaldehyde to form the first coating layer of urea-formaldehyde which was 5% by weight of the fertilizer; 17 parts reactive magnesium oxide and 7 parts monoammonium phosphate powder were added to the granules having the first coating layer by means of IC binder (which was prepared, as shown in Table 2, by adding 5 parts 40% phosphoric acid (based on $P_2O_5$) to 2.6 parts ammonium bicarbonate), to provide the second coating layer containing ammonium magnesium phosphate, which was 26.6% by weight of the fertilizer; and then the third coating layer containing magnesium potassium phosphate, which was 26% by weight of the fertilizer, was formed by using a blend solution of 20% sulfuric acid and 40% phosphoric acid (based on $P_2O_5$) in a ratio of 7:3 as binder, and continuously adding 5 parts monoammonium phosphate and 21 parts potassium chloride powder to the granules having the second coating layer. Finally, 5 parts calcium carbonate stearate was added to provide a hydrophobic layer which was 5% by weight of the total fertilizer. The final product was dried at 70° C. until the water content was less than 2%, and packed up after cooling to obtain a controlled release fertilizer with four coating layers. Measurement with a scanning electroscope found that the average diameter of nucleus was 2,300 μm, and the average total thickness of the four coating layers was 740 μm, and the average diameter of the fertilizer granule was 3780 μm. The composition of the fertilizer was N19%, $P_2O_5$ 10%, $K_2O$ 12%, MgO 10%. Analysis by x-ray diffraction proved that the coating layer contained MgO, $NH_4MgPO_4 \cdot 6H_2O$, $Mg(OH)_2$, $KMgPO_4 \cdot 6H_2O$, $KCaPO4 \cdot H_2O$ (see FIG. 2).

Example 2

10 parts sulfuric acid (10% in concentration) was placed into an acid-proof reaction tank, to which 5 parts monoammonium phosphate powder was added gradually under continuously stirring at ambient temperature, standing for half an hour a binder solution (ID in table 2)was obtained; 33 parts of granular ammonium nitrate was placed into a granulator, into which binder ID was sprayed and 25 parts $NH_4MgPO_4 \cdot 6H_2O$ were added to provide the first coating layer which was 27% by weight of the total fertilizer. To a solution containing 10 parts 5% carboxymethyl cellulose, 4 parts urea powder was added, the mixture was allowed to react for 3 hours to provide binder OB in Table 2. The second coating layer was formed by coating 16 parts synthesized $KMgPO_4 \cdot H_2O$ onto the granules having the first coating layer by means of binder OB, which was 17.7% by weight of the total fertilizer. The third coating layer was formed by coating with 16 parts FMP by means of 30 wt % sulfuric acid as binder, which was 18% by weight of the total fertilizer. Finally, a fine and close shell layer was formed by powdering on the surface of the fertilizer with 4 parts magnesium oxide powder. The final product was dried at 70 C until the water content was less than 2%, and then packed up after cooling to obtain a fertilizer containing N 13%, $P_2O_5$ 18%, $K_2O$ 5% and MgO 3%.

The release rate of the fertilizer in soil was determined as follow:

For this procedure, a ɸ 75×9 cm plastic pot was filled with a simulated soil which was composed of equal parts by volume of vermiculite powder and peat in a particle-size less than 10 mesh. There were several dozens of ɸ 3 mm drainage holes at the bottom of the pot.

Figure 3:
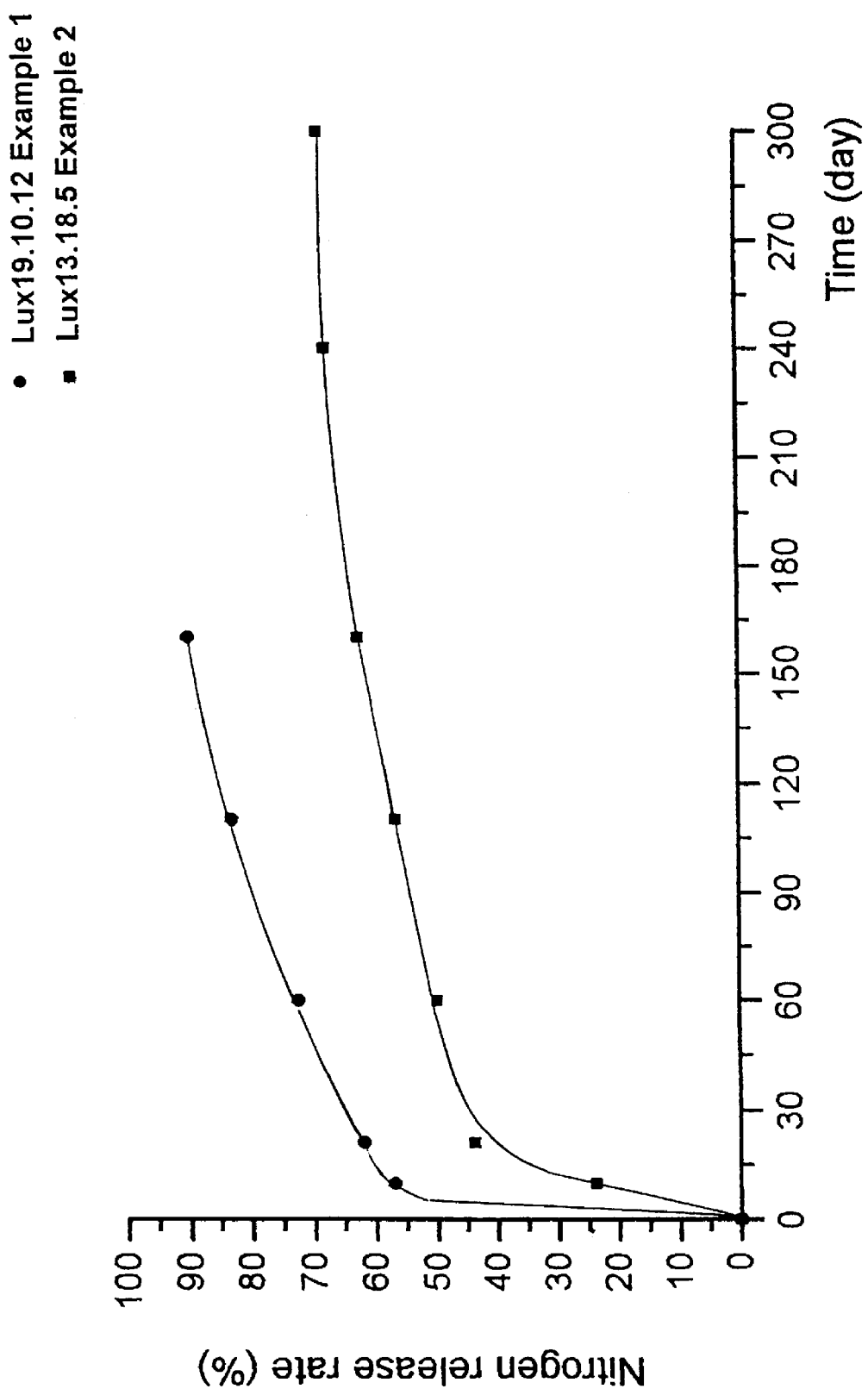
FIG. 3 shows the nitrogen releasing curve of the fertilizers produced according to examples 1 and 2.

The fertilizer sample of example 2(3 g) was incorporated uniformly into the simulated soil. The medium was then surface irrigated with distilled water until the medium was nearly saturated, but with little or no leaching from the pot. The whole installation was sealed and held at a constant temperature of 20° C. After a period of time, the saturated solution was extracted and analyzed for the N content, and resaturated with distilled water. The various release rates at different time can be measured in this way. The release rates curves was shown in FIG. 3.

Effect of the Fertilizer of the Invention

The main advantages of the fertilizer according to the present invention are as follows:

The Fertifizer provides 60, 90, 120 days longevity for nitrogen releasing, high utilization ratio of fertilizer, less frequent application and reduced labor costs;

it provides fully plant nutrients, need not blend with other fertilizers, it is easy for application, it feeds N, P, K and trace elements at one-shot according to the plant requirements;

it makes plants uniform growth, color and appearance, as it contains abundant magnesium which is necessary for plant growth and improves the synthesis of chlorophyll;

high safety for use and no pollutant, no plastic or wax contained in said fertilizer and all the components are plant nutrients;

flexible component and wide adaptability, can meet the needs of different regions and plants.

The fertilizer of the invention can be widely used in the fairways, roughs, parks, race courses, lawn tennis courts, sport grounds, turf farms and lawns.

| | Application Experiment | | |
|---|---|---|---|
| Plant | Lawn, sports ground, golf courts | general green ground, parks | ornamental plant, flowers |
| Rate (kg/100 m²) | 5–7 | 4–6 | 7–9 |

TABLE 1

The present fertilizer Trial Results vs Scotts on Small Plots
Trial Set June 1, 1995

| The present fertilizer | Lbs.N per 1000 Ft² | June 1 | July 1 30days | Aug 1 61days | Sept 1 92days | Oct 1 122days | Nov 1 153days | Longevity days |
|---|---|---|---|---|---|---|---|---|
| 18-6-12 | 1.0# | Set | 9 | 10 | 10 | 7 | 5 | 122 |
| 22-2-10 | 1.0# | Set | 10 | 10 | 10 | 8 | 6 | 122 |
| 18-6-12 | 1.5# | Set | 10 | 10 | 10 | 7 | 5 | 122 |
| 22-2-10 | 1.5# | Set | 10 | 10 | 10 | 9 | 7 | 153 |
| 18-6-12 | 2.0# | Set | 9 | 10 | 10 | 8 | 8 | 153 |
| 22-2-10 | 2.0# | Set | 10 | 10 | 10 | 9 | 8 | 153 |
| Scotts PolyS 21-3-20 | 1.0# | Set | 10 | 10 | 7 | 6 | 4 | 92 |
| 100% PolyS 26-4-12 | 1.0# | Set | 10 | 10 | 7 | 7 | 5 | 122 |
| 100% PolyS 21-0-20 | 1.0# | Set | 9 | 10 | 7 | 5 | 4 | 92 |

TABLE 1-continued

The present fertilizer Trial Results
vs Scotts on Small Plots
Trial Set June 1, 1995

| The present fertilizer | Lbs.N per 1000 Ft² | June 1 | July 1 30days | Aug 1 61days | Sept 1 92days | Oct 1 122days | Nov 1 153days | Longevity days |
|---|---|---|---|---|---|---|---|---|
| 100% PolyS 21-3-20 | 1.5# | Set | 10 | 10 | 7 | 5 | 5 | 92 |
| 26-4-12 | 1.5# | Set | 10 | 9 | 8 | 7 | 6 | 122 |
| 21-0-20 | 1.5# | Set | 10 | 10 | 7 | 5 | 5 | 92 |
| 21-3-20 | 2.0# | Set | 10 | 9 | 9 | 7 | 5 | 122 |
| 26-4-12 | 2.0# | Set | 10 | 10 | 10 | 7 | 5 | 122 |
| 21-0-20 | 2.0# | Set | 10 | 10 | 9 | 7 | 5 | 122 |

Note:
(1) Overall evaluation 1–10 growth color density
(2) Blue grass with come bent and rye
(3) Healthy turf
(4) Good rainfall
(5) Reapplication would occur at 7
(6) "The present fertilizer" in all tables was made according to example 1 of the invention. The type number "a-b-c" means that the contents of nitrogen, phosphorus and potassium are a%, b% and c% respectively. For example "18-6-12" means the contents of nitrogen, phosphorus and potassium are 18%, 6% and 12% respectively. And the type number has the same meaning in comparable examples.

COMMENTS (1) 1. 10 Measuring Scale
(2) 7. Pot Needs Reapplication
(3) Blue Rye Grass—Small amount of Bent and Fescue
(4) Non Irrigated—Good Rainfall During Trial
(5) Trial was to Evaluate Rates Difference over 120 days
(6) August And September where very Hot 90° F. to 100° F.

RESULT (1) 1 pound of N per 1000 Sq Feet Provide good,
(2) 1.5 pound of N per 1000 sq Feet Provided Fast Green Up
(3) 2 to 3 pound of N per 1000 sq Feet provide Excessivem Growth in His Hot time of the year
(4) High Rates 2 to 3 pound N Did not produce A Better Result over time
(5) No Burning was Seen on Any Plots

TABLE 2

Tabulated From Field sheet-by
D. Deirson-Rate Trial of the present fertilizer
Trail set 11/7/95

| The present fertilizer | Lbs of N Lbs/1000 ft | 12/8/95 (32 days) | 15/9/95 (66 days) | 6/10/95 (87 days) | 4/11/95 (116 days) | Snow | Comment |
|---|---|---|---|---|---|---|---|
| 1 × 1000 sq ft | 1# | 10 | 10 | 10 | 10 | Grass stop | Good growth |
| 1 × 1000 sq ft | 1# | 10 | 10 | 10 | 10 | Growring | |
| 1 × 100 sq ft | 1# | 10 | 10 | 10 | 10 | before snow | |
| 1 × 1000 sq f | 1# | 10 | 10 | 10 | 10 | all plots Remained | |
| 1 × 1000 sq ft | 1.5# | 10 | 10 | 10 | 10 | Green | Good first 60 days |
| 1 × 1000 sq ft | 1.5# | 10 | 10 | 10 | 10 | | Good even growth |
| 1 × 1000 sq ft | 1.5# | 10 | 10 | 10 | 10 | | |
| 1 × 1000 sq ft | 1.5# | 10 | 10 | 10 | 10 | | |
| 1 × 1000 sq ft | 2# | 10 | 10 | 10 | 10 | | Excessive |
| 1 × 1000 sq ft | 2# | 10 | 10 | 10 | 10 | | growth first 30 days |
| 1 × 1000 sq ft | 2# | 10 | 10 | 10 | 10 | | |
| 1 × 1000 sq ft | 2# | 10 | 10 | 10 | 10 | | |
| 1 × 1000 sq ft | 2.5# | 10 | 10 | 10 | 10 | | Excessive growth |
| 1 × 1000 sq ft | 2.5# | 10 | 10 | 10 | 10 | | in first 60 days |
| 1 × 1000 sq ft | 2.5# | 10 | 10 | 10 | 10 | | |
| 1 × 1000 sq ft | 2.5# | 10 | 10 | 10 | 10 | | |
| 1 × 1000 sq ft | 3# | 10 | 10 | 10 | 10 | | No Burning |
| 1 × 1000 sq ft | 3# | 10 | 10 | 10 | 10 | | in first 30 days |
| 1 × 1000 sq ft | 3# | 10 | 10 | 10 | 10 | | Excessive growth |
| 1 × 1000 sq ft | 3# | 10 | 10 | 10 | 10 | | |

TABLE 3

Trials of the present fertilizer compared with other controlled release fertilizer in USA

| | Trials on Grass in USA | | | | Trail Conditions | | | | Evaluation Criterion | | | | |
|---|---|---|---|---|---|---|---|---|---|---|---|---|---|
| No. | Location of Trial | Place | Grass type | Date | Product | Lbs of N (Lbs/1000 ft²) | Treated area (ft²) | Irri-gated | Color | Density | Uniform growth | Stress Tolerance | Comment |
| 1 | Bay area California 119°30'W 37°30'N | Alameda Golf Club | Blue Rye | 1/6/95 (31days) | The present fertilizer (20-2-10) IBDU (21-3-16) | 1.5 1.5 | 1000 1000 | ○ ○ | 10 10 | 9 8 | 9 9 | 9 9 | 1. The present fertilizer lasted 120 days effective 2. IBDU lasted 90 days effective |
| | | | | 3/8/95 (93 days) | The present fertilizer (20-2-10) IBDU (21-3-16) | 1.5 1.5 | 1000 1000 | ○ ○ | 10 7 | 10 9 | 9 9 | 8 5 | 3. No rainfall |
| | | | | 5/9/95 (120 day) | The present fertilizer (20-2-10) IBDU (21-3-16) | 1.5 1.5 | 1000 1000 | | 9 5 | 8 6 | 8 6 | 8 4 | |
| 2 | Tuf-Turf Kansas 94°38'W 39°07'N | Land-scape Co. | Blue Rye | 6/7/95 (30 days) | The present fertilizer (20-2-10) Scotts Poly-S (21-2-21) | 3/4 3/4 | 1000 1000 | × × | 10 10 | 9 9 | 9 9 | 9 9 | 1. The present fertilizer lasted 120 days effective 2. Scotts longevity lasted 60 days |
| | | | | 7/8/95 (72 days) | The present fertilizer (20-2-10) Scotts Poly-S (21-2-21) | 3/4 3/4 | 1000 1000 | × × | 9 7 | 9 7 | 9 8 | 9 7 | 3. Heavy rain 15 in. in month reduced longevity of both products. |
| | | | | 10/9/95 (120 day) | The present fertilizer (20-2-10) Scotts Poly-S (21-2-21) | 3/4 3/4 | 1000 1000 | | 8 5 | 7 5 | 7 5 | | |
| 3 | Nebraska 100°00'W 41°31'N | Dokoto City | Blue Rye | 14/8/95 | The present fertilizer (20-2-10) 7WIR (16-2-13) | 1.5 1.5 | 1000 1000 | ○ ○ | 8 8 | 7 8 | 7 7 | 7 7 | |
| | | | | | The present fertilizer (20-2-10) 7WIR (16-2-13) | 3/4 3/4 | 1000 1000 | ○ ○ | 8 8 | 8 8 | 8 8 | 8 8 | |
| | | | | | The present fertilizer (20-2-10) | 1 | 1500 | ○ | 7 | 7 | 7 | 7 | |
| | | | | | 7WIR (16-2-13) The present fertilizer (20-2-10) 7WIR (16-2-13) | 1 3/4 3/4 | 500 2000 2000 | ○ × × | 6 5 5 | 6 6 6 | 6 5 6 | 6 5 5 | |
| 4 | Texas 94°54'W 29°24'N | Waco | Burmu-da | 7/8/95 (34 days) | The present fertilizer (20-2-10) | 1.8 | 2000 | ○ | 10 | 10 | 10 | 10 | Product lasted in hot condition 138 days before cooling took place. |
| | | | | 4/10/95 (95 days) | The present fertilizer (20-2-10) | 1.8 | 2000 | ○ | 10 | 10 | 10 | 10 | |
| | | | | 16/11/95 (138 day) | The present fertilizer (20-2-10) | 1.8 | 2000 | ○ | 10 | 10 | 10 | 10 | |
| | | | | 10/8/95 (30 days) | The present fertilizer (20-2-10) Scotts Poly-S (25-3-10) ONCE(34-4-7) | 1.5 1.4 3.0 | 6600 10000 5600 | × × × | 10 10 9 | 10 10 10 | 10 10 10 | 10 10 10 | 1. LUXACOTE lasted 120 days and still remained green. |
| | Ollio | urban | Blue | 14/9/95 | The present fertilizer | 1.5 | 6600 | × | 10 | 10 | 10 | 10 | 2. Cool weather slowed |

TABLE 3-continued

Trials of the present fertilizer compared with other controlled release fertilizer in USA

| | Trials on Grass in USA | | | | Trail Conditions | | | | Evaluation Criterion | | | | | |
|---|---|---|---|---|---|---|---|---|---|---|---|---|---|---|
| No. | Location of Trial | Place | Grass type | Date | Product | Lbs of N (Lbs/1000 ft²) | Treated area (ft²) | Irrigated | Color | Density | Uniform growth | Stress Tolerance | Comment |
| | Illinois | Golf Club | grass | (65 days) | (20-2-10) Scotts | 1.4 | 10000 | x | 10 | 10 | 10 | 9 | growth (grass). |
| | | | | | Poly-S (25-3-10) ONCE(34-4-7) | 3.0 | 5600 | x | 10 | 10 | 10 | 10 | 3. Scott 100% Poly-S did not last 120 days as expected. |
| 5 | 89°00'W 40°00'N | School football fields | Fescue | 15/10/95 (96 days) | The present fertilizer (20-2-10) Scotts | 1.5 | 6600 | x | 10 | 10 | 10 | 10 | |
| | | | | | Poly-S (25-3-10) ONCE(34-4-7) | 1.4 | 10000 | x | 10 | 10 | 9 | 9 | |
| | | | | 12/11/95 | The present fertilizer (20-2-10) Scotts | 3.0 | 5600 | x | 10 | 10 | 10 | 10 | |
| | | | | | | 1.5 | 6600 | x | 9 | 10 | 9 | 9 | |
| | | | | | Poly-S (25-3-10) | 1.4 | 10000 | x | 7 | 8 | 7 | 7 | |
| | | | | (123 day) | ONCE(34-4-7) | 3.0 | 5600 | x | 10 | 10 | 9 | 9 | |
| 6 | Carmel Indiana | Terra office (trial by Rich Grant) | Ftcue | 11/7/95 | The present fertilizer (20-2-10) | 1/2 1 | 1000 1000 | | | | | | 1. Lasted 120 day. 2. Rich Grant reported that LUXACOTE was effective for 120 day. 3. Trial conducted in landscape situation at back of terra office. |
| | 86°15'W 40°00'N | | Blue Rye | | The present fertilizer (18-6-12) | 1/2 1 | 1000 1000 | | | | | | |
| 7 | | Research station | | 24/7/95 | The present fertilizer (20-2-10) | 2 | 5000 | ○ | 5 | 3 | 7 | | My understanding that LUXACOTE maintained good performance untill fall cool season. |
| | | | | | The present fertilizer (20-2-10) | 1 | 5000 | ○ | 10 | 10 | 10 | | |
| | | | | | 50% Poly-S(24-4-16) | 2 | 5000 | ○ | 7 | 3 | 3 | | |
| | | | | | 50% Poly-S(24-4-16) | 1 | 5000 | ○ | 3 | 3 | 7 | | |
| 8 | Michigan 86°54'W 41°43'N | Gay Lord Country Club | Bent Blue | 1/10/95 (60 day) | The present fertilizer (20-2-10) | 1 | 1000 Two compete Fairway | | 9 | 9 | 9 | 9 | 1. Evaluated after 90 days, cool weather in oct. stoped grass growthlooked good until snow. 2. Provided equal results after 90 days with 100% Poly-S product 3. Would use again next year. No burning or darmage on bent fairway. |

We claim:

1. A controlled release granular fertilizer having water-soluble fertilizers as a nucleus and limited-soluble plant nutrient compounds as coating layers, wherein more than two coating layers of limited-soluble compounds are formed around the nucleus, by bonding the nucleus with the coating layers having various solubilties by means of an aqueous 6–30 wt % sulfuric acid or 30–60 wt % phosphoric acid (based on $P_2O_5$) solution mixed with monoammonium phosphate, diammonium phosphate, or ammonium bicarbonate as a binder, and the release rates of the nutrient compounds are controlled by regulating the solubilities of the limited-soluble compounds.

2. A controlled release granular fertilizer having water-soluble fertilizers as a nucleus and limited-soluble plant nutrient compounds as coating layers, wherein more than two coating layers are formed around the nucleus by bonding the nucleus with the coating layers by means of an inorganic reactive binder comprising an aqueous 6–30 wt % sulfuric acid or 30–60 wt % phosphoric acid (based on $P_2O_5$) solution alone or a mixture of an aqueous sulfuric acid or phosphoric acid solution mixed with monoammonium phosphate, diammonium phosphate, ammonium bicarbonate or ammonium sulphate, said limited-soluble plant nutrient compounds are formed by reacting compounds containing nitrogen, phosphorous, potassium, magnesium and trace elements selected from the group consisting of MgO, CaO, ZnO, $MnSO_4$, KCL, and $K_2SO_4$ with said inorganic reactive binder during coating; and the release rate of the nutrient compounds are controlled by regulating the solubilities of the limited-soluble compounds.

3. The controlled release fertilizer according to claim 1 or 2, wherein the solubilities of the limited soluble compounds are adjusted by adding at least one inorganic salt selected from the group consisting of ammonium sulphate, ammonium chloride, ammonium nitrate, and magnesium sulphate, and/or by regulating pH values of the coating layers.

4. The controlled release fertilizer according to claim 1 or 2, wherein the surfaces of the controlled release fertilizer are treated with silicone or calcium carbonate stearate to enhance the hydrophobicity of the coating layers, and magnesium oxide is used as a powder to smooth the surfaces.

* * * * *